(12) United States Patent
Park et al.

(10) Patent No.: US 9,891,492 B2
(45) Date of Patent: Feb. 13, 2018

(54) ARRAY SUBSTRATE AND LIQUID CRYSTAL DISPLAY INCLUDING THE SAME

(71) Applicant: Samsung Display Co. Ltd., Yongin (KR)

(72) Inventors: Seung Hyun Park, Seoul (KR); Jean Ho Song, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/947,881

(22) Filed: Nov. 20, 2015

(65) Prior Publication Data

US 2016/0349587 A1    Dec. 1, 2016

(30) Foreign Application Priority Data

May 27, 2015  (KR) .................. 10-2015-0073681

(51) Int. Cl.
*G02F 1/1337* (2006.01)
*G02F 1/1362* (2006.01)
*G02F 1/1343* (2006.01)

(52) U.S. Cl.
CPC .. *G02F 1/136286* (2013.01); *G02F 1/134309* (2013.01); *G02F 1/136209* (2013.01); *G02F 2001/13629* (2013.01)

(58) Field of Classification Search
None
See application file for complete search history.

(56) References Cited

U.S. PATENT DOCUMENTS

2014/0313463 A1* 10/2014 Jang .................. G02F 1/136209
349/106

FOREIGN PATENT DOCUMENTS

| JP | 2014078024 | 5/2014 |
|---|---|---|
| KR | 1020020005997 | 1/2002 |
| KR | 1020040096424 | 11/2004 |
| KR | 1020070120234 | 12/2007 |
| KR | 1020140085784 | 7/2014 |

* cited by examiner

*Primary Examiner* — Richard Kim
(74) *Attorney, Agent, or Firm* — Cantor Colburn LLP

(57) ABSTRACT

Array substrate includes a gate line which extends along a first direction, a gate insulating layer which covers the gate line, a data line located on the gate insulating layer and intersects the gate line, a thin-film transistor ("TFT") which has a control electrode connected to the gate line and an electrode connected to the data line, a pixel electrode connected to the other electrode of the TFT, where the pixel electrode includes branch electrodes, openings are defined between the branch electrodes, each of the openings includes a first bent portion which corresponds to a middle part of the pixel area and a second bent portion and a third bent portion located symmetrically to each other with respect to the first bent portion, and the data line includes a cover region which protrudes toward the pixel area and covers at least part of the pixel area.

8 Claims, 6 Drawing Sheets

ARRAY SUBSTRATE AND LIQUID CRYSTAL DISPLAY INCLUDING THE SAME

This application claims priority to Korean Patent Application No. 10-2015-0073681 filed on May 27, 2015 and all the benefits accruing therefrom under 35 U.S.C. § 119, the content of which in its entirety is incorporated herein by reference.

BACKGROUND

1. Field

The invention relates to an array substrate and a liquid crystal display ("LCD") having the same.

2. Description of the Related Art

Liquid crystal displays ("LCDs") consume low power due to low operating voltage and are portable. Due to these advantages, LCDs are applied in a wide variety of fields including notebook computers, monitors, spaceships, and airplanes. An LCD includes a lower substrate, an upper substrate, and a liquid crystal layer formed between the two substrates. In the LCD, the arrangement of liquid crystal molecules in the liquid crystal layer is controlled according to whether an electric field is applied to the liquid crystal layer, and the transmittance of light is thereby controlled. As a result, an image is displayed on the LCD.

LCDs configured as described above are being developed into various modes according to the way the arrangement of liquid crystal molecules in a liquid crystal layer is controlled, such as twisted nematic ("TN")-mode LCDs, vertical alignment ("VA")-mode LCDs, in-plane switching-mode LCDs, and fringe field switching-mode LCDs.

Here, a fringe field-type thin-film transistor ("TFT") substrate includes a gate line and a data line which intersect each other, a TFT which is connected to the gate line and the data line, a protection layer which covers the TFT, a finger-shaped pixel electrode which is connected to the TFT, and a common electrode which forms a fringe field with the pixel electrode with the protection layer interposed therebetween.

SUMMARY

In order to increase the alignment stability of liquid crystals in which a fringe field is formed, a structure in which a middle part of the finger-shaped pixel electrode protrudes toward a neighboring pixel area has been suggested. However, as the resolution of liquid crystal displays ("LCDs") increases, a gap between pixels is reduced. Therefore, a pixel electrode having a protruding middle part affects liquid crystals in an adjacent pixel, thereby causing the leakage of light in the adjacent pixel.

Exemplary embodiments of the invention provide an array substrate which can increase the alignment stability of liquid crystals and prevent the leakage of light in an adjacent pixel.

Exemplary embodiments of the invention also provide an LCD which can increase the alignment stability of liquid crystals and prevent the leakage of light in an adjacent pixel.

However, exemplary embodiments of the invention are not restricted to the one set forth herein. The above and other exemplary embodiments of the invention will become more apparent to one of ordinary skill in the art to which the invention pertains by referencing the detailed description of the invention given below.

According to an exemplary embodiment of the invention, an array substrate includes a gate line which extends along a first direction, a gate insulating layer which covers the gate line, a data line which is located on the gate insulating layer and intersects the gate line to define a pixel area, a thin-film transistor ("TFT") which has a control electrode connected to the gate line and an electrode connected to the data line, a pixel electrode which is connected to the other electrode of the TFT and located in the pixel area, a common electrode which overlaps the pixel electrode, and an insulating layer which is located between the pixel electrode and the common electrode, where the pixel electrode includes a plurality of branch electrodes and a plurality of openings defined between the branch electrodes, where each of the openings includes a first bent portion which corresponds to a middle part of the pixel area and a second bent portion and a third bent portion which are located symmetrically to each other with respect to the first bent portion, and the data line includes a cover region which protrudes toward the pixel area and covers at least part of the pixel area.

In an exemplary embodiment, the pixel area may include a first domain which is located higher than the middle part of the pixel area, a second domain which is located lower than the middle part of the pixel area, and a domain boundary region which corresponds to the middle part of the pixel area, where the first domain corresponds to the second bent portion, the second domain corresponds to the third bent portion, each opening located in the domain boundary region defines a first angle to a virtual line which extends along a second direction perpendicular to the first direction, and each opening located in the first domain and the second domain defines a second angle, which is smaller than the first angle, to the virtual line.

In an exemplary embodiment, the data line may include a part which extends symmetrically with respect to the middle part of the pixel area while defining the second angle to the virtual line.

In an exemplary embodiment, the cover region may protrude toward the middle part of the pixel area to overlap the first bent portion in the first direction.

In an exemplary embodiment, the branch electrodes may be shaped like the openings, and each may include a plurality of inflection points respectively corresponding to the first bent portion, the second bent portion and the third bent portion.

In an exemplary embodiment, a protruding width of the cover region may be smaller than a width of the data line.

In an exemplary embodiment, the cover region may include a blocking metal layer.

In an exemplary embodiment, the data line may include a block metal layer.

According to another exemplary embodiment of the invention, an array substrate includes a first gate line which extends along a first direction, a gate insulating layer which covers the first gate line, a first data line which is located on the gate insulating layer and intersects the first gate line to define a first pixel area, a second data line which is located on the gate insulating layer along the first direction to extend side by side with the first data line and intersects the first gate line to define a second pixel area, a first pixel electrode which is located in the first pixel area, a second pixel electrode which is located in the second pixel area, a common electrode which overlaps the first pixel electrode and the second pixel electrode, and a first insulating layer which is located between the first and second pixel electrodes and the common electrode, where the first pixel area overlaps a first color filter, the second pixel area overlaps a second color filter which has a different color from the first color filter, and each of the first pixel electrode and the second pixel electrode includes a plurality of branch electrodes and a plurality of openings defined between the branch electrodes, where each of the openings includes a first bent portion which corresponds to a middle part of each of the first and second pixel areas and a second bent portion and a third bent portion which are located symmetrically to each other with respect to the first bent portion, and only the first data line includes a cover region which covers at least part of the first pixel area.

In an exemplary embodiment, each of the first pixel area and the second pixel area may include, a first domain which is located higher than the middle part of the first or second pixel area, a second domain which is located lower than the middle part of the first or second pixel area, and a domain boundary region which corresponds to the middle part of the first or second pixel area, where the first domain corresponds to the second bent portion, the second domain corresponds to the third bent portion, each opening located in the domain boundary region defines a first angle to a virtual line which extends along a second direction perpendicular to the first direction, each opening located in the first domain and the second domain defines a second angle, which is smaller than the first angle, to the virtual line, and each of the first data line and the second data line includes a part which extends symmetrically with respect to the middle part of the first or second pixel area while defining the second angle to the virtual line.

In an exemplary embodiment, a cover region which covers at least part of the second pixel area may not be provided in the second data line.

In an exemplary embodiment, the first color filter may be a green color filter, and the second color filter is a red color filter or a blue color filter.

In an exemplary embodiment, the first color filter may be a white color filter, and the second color filter is a green color filter, a red color filter, or a blue color filter.

In an exemplary embodiment, a protruding width of the cover region may be smaller than a width of each of the first data line and the second data line.

In an exemplary embodiment, the cover region may include a blocking metal layer, and each of the first data line and the second data line may include a blocking metal layer.

In an exemplary embodiment, the cover region may protrude toward the middle part of the first pixel area to overlap the first bent portion in the first direction.

According to another exemplary embodiment of the invention, a liquid crystal includes a first display substrate, a second display substrate which is located opposite the first display substrate, and a liquid crystal layer which is interposed between the first display substrate and the second display substrate, where the first display substrate includes a gate line which extends along a first direction, a gate insulating layer which covers the gate line, a data line which is located on the gate insulating layer and intersects the gate line to define a pixel area, a TFT which has a control electrode connected to the gate line and an electrode connected to the data line, a pixel electrode which is connected to the other electrode of the TFT and located in the pixel area, a common electrode which overlaps the pixel electrode, and an insulating layer which is located between the pixel electrode and the common electrode, where the pixel electrode includes a plurality of branch electrodes and a plurality of openings defined between the branch electrodes, where each of the openings includes a first bent portion which corresponds to a middle part of the pixel area and a second bent portion and a third bent portion which are located symmetrically to each other with respect to the first bent portion, and the data line includes a cover region which protrudes toward the pixel area and covers at least part of the pixel area.

In an exemplary embodiment, the pixel area may include a first domain which is located higher than the middle part of the pixel area, a second domain which is located lower than the middle part of the pixel area, and a domain boundary region which corresponds to the middle part of the pixel area, where the first domain corresponds to the second bent portion, the second domain corresponds to the third bent portion, each opening located in the domain boundary region defines a first angle to a virtual line which extends along a second direction perpendicular to the first direction, each opening located in the first domain and the second domain defines a second angle, which is smaller than the first angle, to the virtual line, and the data line includes a part which extends symmetrically with respect to the middle part of the pixel area while defining the second angle to the virtual line.

In an exemplary embodiment, the branch electrodes may be shaped like the openings, and each may include a plurality of inflection points respectively corresponding to the first bent portion, the second bent portion and the third bent portion.

In an exemplary embodiment, the cover region may protrude toward the middle part of the pixel area to overlap the first bent portion in the first direction, and the cover region and the data line may include a blocking metal layer.

BRIEF DESCRIPTION OF THE DRAWINGS

The above and other exemplary embodiments, features and features of the invention will become more apparent by describing in detail exemplary embodiments thereof with reference to the attached drawings, in which.

DETAILED DESCRIPTION

Figure 1:
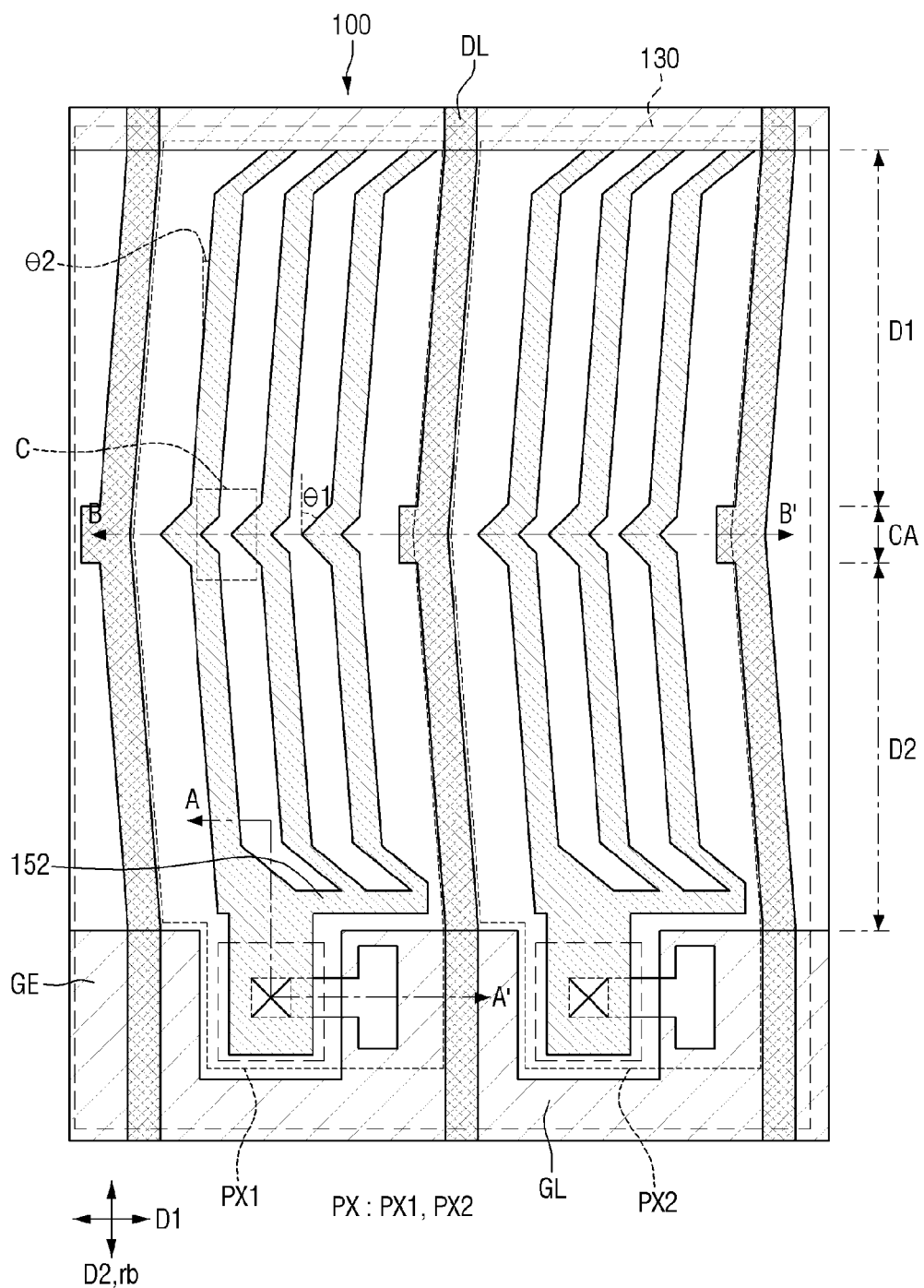
FIG. 1 is a plan view of a liquid crystal display ("LCD") according to an exemplary embodiment of the invention.

Advantages and features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments will hereinafter be described with reference to the accompanying drawings.

Figure 2:
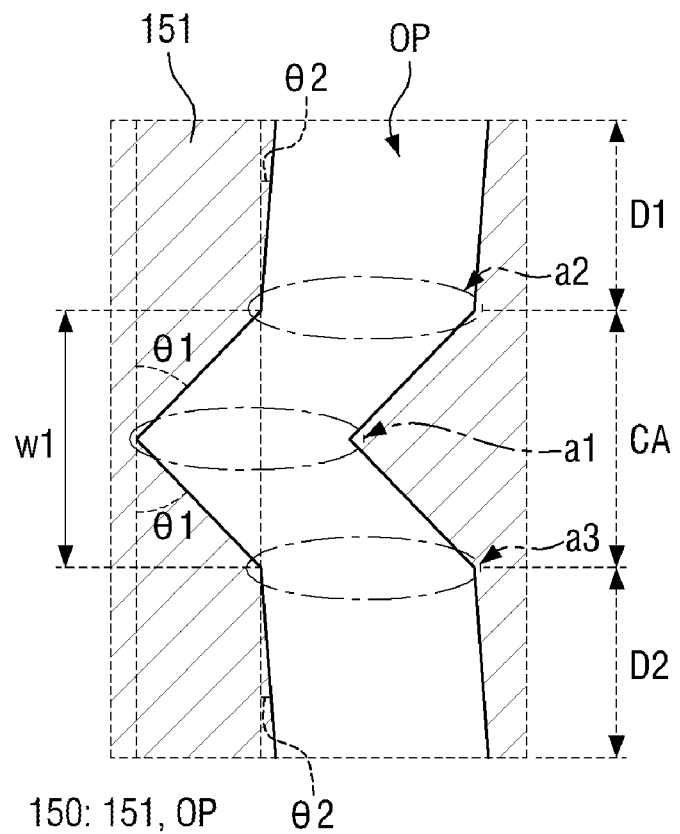
FIG. 2 is an enlarged plan view of a region 'C' of FIG. 1.
Figure 3:
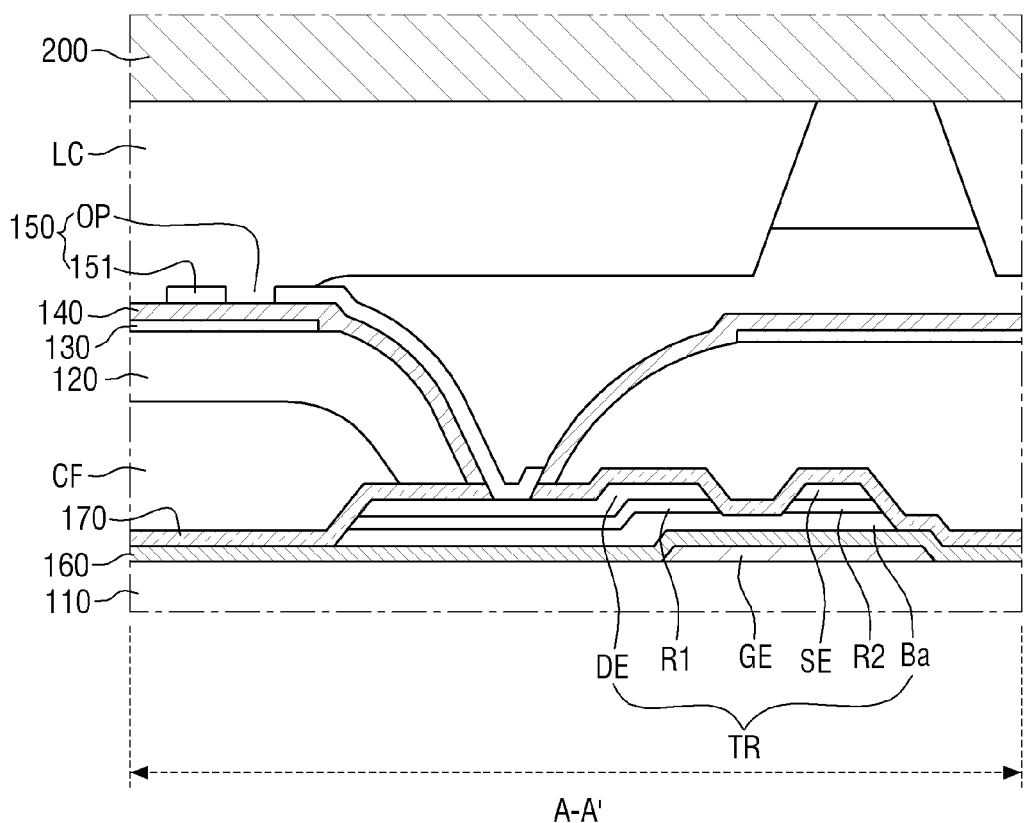
FIG. 3 is a cross-sectional view taken along line A-A' of FIG. 1.
Figure 4:
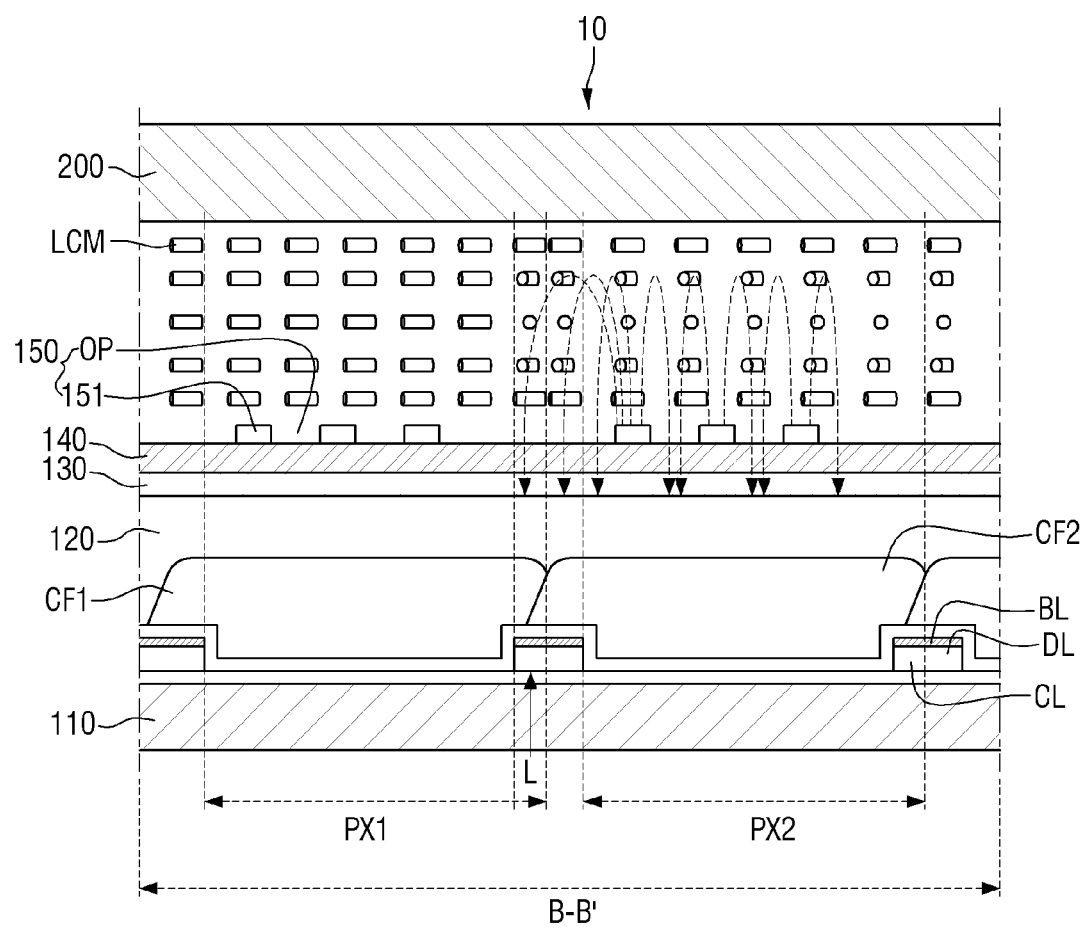
FIG. 4 is a cross-sectional view taken along line B-B' of FIG. 1.

FIG. 1 is a plan view of a liquid crystal display ("LCD") 10 according to an exemplary embodiment of the invention. FIG. 2 is an enlarged plan view of a region 'C' of FIG. 1. FIG. 3 is a cross-sectional view taken along line A-A' of FIG. 1. FIG. 4 is a cross-sectional view taken along line B-B' of FIG. 1.

Referring to FIGS. 1 through 4, the LCD 10 according to the illustrated exemplary embodiment includes a first display substrate 100 which includes a first substrate 110, a second display substrate 200 which is located opposite to the first display substrate 100, and a liquid crystal layer LC which is interposed between the first display substrate 100 and the second display substrate 200. The first display substrate 100, the second display substrate 200, and the liquid crystal layer LC may constitute one LCD panel.

In an exemplary embodiment, each of the first display substrate 100 and the second display substrate 200 may be shaped like a rectangular parallelepiped, for example. While the first display substrate 100 and the second display substrate 200 shaped like rectangular parallelepipeds are illustrated in FIG. 1 for ease of description, the shapes thereof are not limited to the rectangular parallelepipeds. Each of the first display substrate 100 and the second display substrate 200 can be fabricated in various shapes according to the shape of the LCD panel. The liquid crystal layer LC may be interposed between the first display substrate 100 and the second display substrate 200. In addition, a sealing member may be placed between the first display substrate 100 and the second display substrate 200 along edges of the first display substrate 100 and the second display substrate 200, thereby bonding and sealing the first display substrate 100 and the second display substrate 200 together. In an exemplary embodiment, the LCD panel may further include a driving unit and a flexible printed circuit board ("FPCB") (not illustrated) attached to the first display substrate 100. The driving unit may transmit various signals (e.g., a driving signal) needed to display an image in a display area to the first display substrate 100. The FPCB may output various signals to the driving unit. The first display substrate 100 may be an array substrate that electrically controls the arrangement state of liquid crystal molecules in the liquid crystal layer LC. The LCD 10 according to the illustrated exemplary embodiment may further include a backlight assembly (not illustrated) located under the LCD panel. The transmittance of light from the backlight assembly through the LCD panel may vary according to the degree by which the arrangement of the liquid crystal molecules in the liquid crystal layer LC is adjusted by the first display substrate 100, and gray levels may be expressed according to the transmittance of the light. In an exemplary embodiment, the liquid crystal layer LC may include a nematic liquid crystal material having positive dielectric anisotropy. Liquid crystal molecules of the liquid crystal layer LC may have their long axes arranged parallel to the first display substrate 100.

The first display substrate 100 may include the first substrate 110, a plurality of thin-film transistors ("TFTs") TR, a plurality of color filters CF, a first insulating layer 120, a common electrode 130, a second insulating layer 140, and a plurality of pixel electrodes 150. Each of the TFTs TR may include a gate electrode GE, a source electrode SE, a drain electrode DE, and a semiconductor active layer Ba.

The first substrate 110 may include a material having superior light-transmitting, heat-resistant, and chemically resistant properties. In an exemplary embodiment, the first substrate 110 may include at least one of glass, polyethylene naphthalate, polyethylene terephthalate and polyacryl having superior light-transmitting properties, for example. A plurality of gate lines GL and a plurality of data lines DL intersecting the gate lines GL may be disposed on the first substrate 110. The gate lines GL and the data lines DL may intersect each other with a gate insulating layer 160 interposed therebetween, thereby defining a plurality of pixel areas PX. The gate lines GL may be disposed on the first substrate 110, and the gate insulating layer 160 may be provided to cover the gate lines SL. The data lines DL may be disposed on the gate insulating layer 160. The first substrate 110 may include the pixel areas PX defined by the gate lines GL and the data lines DL. Here, each of the pixel areas PX may be an area operated independently according to a gate line GL and a data line DL connected thereto and may be defined as a vertical area perpendicular to a vertical plane of the first substrate 110.

In an exemplary embodiment, the gate lines GL may include an aluminum (Al)-based metal such as aluminum or an aluminum alloy, a silver (Ag)-based metal such as silver or a silver alloy, a copper (Cu)-based metal such as copper or a copper alloy, a molybdenum (Mo)-based metal such as molybdenum or a molybdenum alloy, chrome (Cr), titanium (Ti), or tantalum (Ta). In an exemplary embodiment, the data lines DL may include a refractory metal, such as molybdenum, chrome, tantalum or titanium, or an alloy of these metals. In an exemplary embodiment, each of the data lines DL may have a multilayer structure including a refractory metal layer and a conductive layer having low resistivity. In an exemplary embodiment, the gate insulating layer 160 may include silicon nitride (SiNx) or silicon oxide (SiOx) and may have a multilayer structure including at least two insulating layers having different physical properties, for example. The gate lines GL may supply scan signals received from a gate driver (not illustrated), and the data lines DL may supply data voltages received from a data driver (not illustrated).

The TFTs TR may correspond to the pixel areas PX, respectively. The gate electrode GE may protrude from a gate line GL in each pixel area PX. The semiconductor active layer Ba may be disposed on the gate insulating layer 160 to overlap a region of the gate electrode GE. In an exemplary embodiment, the semiconductor active layer Ba may include amorphous silicon or polycrystalline silicon, for example. Resistive contact members R1 and R2 may be disposed on the semiconductor active layer Ba. In an exemplary embodiment, each of the resistive contact members R1 and R2 may include an n+ hydrogenated amorphous silicon material heavily doped with an n-type impurity (such as phosphorous) or may include silicide, for example. The resistive contact members R1 and R2 may be provided as a pair and may be located accordingly on the semiconductor active layer Ba. The source electrode SE and the drain electrode DE may be located on the resistive contact members R1 and R2 and the gate insulating layer 160. The source electrode SE may be a region of each data line DL and deliver a data voltage received through each data line DL to the drain electrode DE via the semiconductor active layer Ba having a channel. The drain electrode DE may be connected to each pixel electrode 150 and deliver a data voltage to each pixel electrode 150. That is, each of the TFTs TR may charge a pixel electrode 150 with a data voltage received through a data line DL in response to a scan signal received through a gate line GL. A protection layer 170 may further be disposed on each of the TFTs TR to protect an exposed portion of the semiconductor active layer Ba, etc.

The color filters CF may correspond to the pixel areas PX, respectively. Specifically, each of the color filters CF may overlap a light-transmitting region in a pixel area PX and change the color of transmitted light. In the illustrated exemplary embodiment, the color filters CF may be disposed on the first display substrate 100. However, the invention is not limited thereto, and the color filters CF can also be disposed on the second display substrate 200. The color filters CF may be located on the gate insulating layer 160 to correspond to the pixel areas PX, respectively. The color filters CF disposed on the first display substrate 100 can prevent the leakage of light or a reduction in aperture ratio due to the misalignment of the first display substrate or the second display substrate 200.

The first insulating layer 120 may be disposed on the color filters CF and the TFTs TR. In an exemplary embodiment, the first insulating layer 120 may be an organic layer including an organic material, for example. The first insulating layer 120 may prevent the color mixing of the color filters CF and the contact of the TFTs TR with other elements.

The common electrode 130 may be disposed on the first insulating layer 120. The common electrode 130 may be a transparent conductive layer and generate a fringe field with each of the pixel electrodes 150. The common electrode 130 may overlap most regions of each pixel area PX, excluding some regions.

The second insulating layer 140 may be disposed on the common electrode 130, and the pixel electrodes 150 may be disposed on the second insulating layer 140. The pixel electrodes 150 may be located to correspond to the pixel areas PX, respectively. Contact holes may be defined in the first insulating layer 120 and the second insulating layer 140. Each of the pixel electrodes 150 may be connected to the drain electrode DE of a TFT TR by a contact hole and receive a data voltage from the drain electrode DE. A plurality of openings OP may be defined in each of the pixel electrodes 150 which generate a fringe field with the common electrode 130.

Each of the pixel electrodes 150 may include a plurality of branch electrodes 151, the openings OP defined between the neighboring branch electrodes 151, and a connection electrode 152 which connects respective ends and/or the other respective ends of the branch electrodes 151. Each opening OP of each of the pixel electrodes 150 may be shaped like a bar having at least two bent portions. The branch electrodes 151 may have a shape corresponding to the openings OP. The openings OP in each of the pixel electrodes 150 may be bent symmetrically with respect to a middle part of a pixel area PX. Due to the pixel electrodes 150 structured as described above, a main fringe field may be generated in different directions in upper and lower parts higher and lower than the middle part of each pixel area PX. Accordingly, two domains may be disposed in each pixel area PX. Liquid crystals located in different domains of one pixel area PX move differently. Ultimately, long axes of the liquid crystal molecules are disposed in different directions, thus reducing a color shift phenomenon at a certain azimuth. The middle part of each pixel area PX may be defined as a domain boundary region CA, and a region located higher than the middle part may be defined as a first domain D1, and a region located lower than the middle part may be defined as a second domain D2. An azimuth at which a color shift occurs in the first domain D1 is different from an azimuth at which a color shift occurs in the second domain D2. Therefore, color shift phenomena in different domains may compensate for each other, thus preventing a reduction in display quality due to the color shift phenomena. Here, each opening OP of each pixel electrode 150 may include a first bent portion a1 which corresponds to the middle part of a pixel area PX and a second bent portion a2 and a third bent portion a3 which are separated from the first bent portion a1 and located symmetrically to each other with respect to the first bent portion a1. The first bent portion a1 may correspond to the domain boundary region CA, the second bent portion a2 may correspond to the first domain D1, and the third bent portion a3 may correspond to the second domain D2. Each opening OP may have a symmetrical structure with respect to a virtual line that passes through the first bent portion a1 located in the middle part of each pixel area PX and extends parallel to a gate line GL.

Here, each opening OP located in the first domain D1 and the second domain D2 may define a second angle $\theta 2$ with respect to a virtual line perpendicular to the gate line GL. The virtual line perpendicular to the gate line GL may extend in a rubbing direction rb. Each opening OP may extend upward from the second bent portion a2 in a pixel area PX while defining the second angle $\theta 2$ with the rubbing direction rb. In addition, each opening OP may extend downward from the third bent portion a3 in the pixel area PX while defining the second angle $\theta 2$ with the rubbing direction rb. Each opening OP located between the first bent portion a1 and the second bent portion a2 and between the first bent portion a1 and the third bent portion a3 may have a first angle $\theta 1$ greater than the second angle $\theta 2$. In an exemplary embodiment, the second angle $\theta 2$ may be in a range of, but not limited to, approximately 5 degrees to approximately 10 degrees, and the first angle $\theta 1$ may be in a range of, but not limited to, approximately 20 degrees to approximately 40 degrees, for example.

In the domain boundary region CA, each opening OP which is symmetrical with respect to the first bent portion a1 may have an included angle of approximately 100 degrees to approximately 140 degrees, and liquid crystal molecules corresponding to each opening OP of the domain boundary region CA may have a difference of approximately 40 degrees to approximately 80 degrees in arrangement direction. Therefore, the rotational torque of the liquid crystal molecules may increase significantly to be greater than a torque that hinders the rotation of the liquid crystal molecules caused by general external pressure. In addition, the liquid crystal molecules may be prevented from being placed parallel to each other in the first and second domains D1 and D2. This can suppress the formation of stains due to a luminance difference. That is, since the confusion in the alignment of the liquid crystal molecules can be suppressed in the domain boundary region CA, the alignment stability of the liquid crystal molecules can be increased.

In addition, each opening OP of each pixel electrode 150 according to the illustrated exemplary embodiment may further include an additional bent portion between the second bent portion a2 and the connection electrode 151 and the third bent portion a3 and the connection electrode 151. The additional bent portion can further increase the alignment stability of the liquid crystal molecules.

The branch electrodes 151 of each pixel electrode 150 may be shaped like the openings OP described above. Each of the branch electrodes 151 may include inflection points respectively corresponding to the first bent portion a1, the second bent portion a2, and the third bent portion a3. Each pixel electrode 150 corresponding to the domain boundary region CA may protrude further than each pixel electrode 150 corresponding to the first and second domains D1 and D2. In a first pixel area PX1 and a second pixel area PX2 defined along a first direction d1, a pixel electrode 150 corresponding to the domain boundary region CA of the second pixel area PX2 may protrude toward the first pixel area PX1. A pixel electrode 150 protruding toward a neighboring pixel area may generate a parasitic field in the neighboring pixel area, thus causing the leakage of light. Here, when the neighboring pixel area overlaps a color filter of a different color, light of an unintended color can be emitted.

FIG. 4 illustrates a case where a data voltage has been applied not to a pixel electrode 150 of the first pixel area PX1 but only to a pixel electrode 150 of the second pixel area PX2. That is, the arrangement direction of liquid crystal molecules LCM located in the second pixel area PX2 may be changed by a fringe field generated between the pixel electrode 150 and the common electrode 130 of the second pixel area PX2. The arrangement direction of the liquid crystal molecules LCM located in the first pixel area PX1 may not be changed because no fringe field is generated. However, the protruding pixel electrode 150 of the second pixel area PX2 may generate a parasitic fringe field E with the common electrode 130 located in the neighboring first pixel area PX1. The parasitic fringe field E may affect the arrangement direction of the liquid crystal molecules LCM located in a region of the first pixel area PX1 which is adjacent to the second pixel area PX2. That is, the arrangement direction of the liquid crystal molecules LCM located in the above region can be changed by the unintended parasitic fringe field E. Each data line DL of the LCD 10 according to the illustrated exemplary embodiment may overlap the first bent portion a1 in the first direction D1 and include a cover region CL which protrudes toward a pixel area PX.

The data lines DL according to the illustrated exemplary embodiment may extend, on the whole, along a second direction D2 perpendicular to the first direction D1. In view of aperture ratio and transmittance in each pixel area PX, each data line DL passing between the pixel areas PX may extend at a certain angle. Each data line DL passing between the pixel areas PX may extend in a direction corresponding to a direction in which each opening OP corresponding to the first domain D1 and the second domain D2 extends. Each data line DL passing between the pixel areas PX may extend along the second direction D2 at the second angle $\theta 2$ and may be symmetrical with respect to the middle part of a corresponding pixel area PX. Each data line DL may include a part which extends at the second angle $\theta 2$ to the second direction D2 while being symmetrical with respect to the middle part of a corresponding pixel PX.

Each data line DL may include the cover region CL which covers at least a region of a pixel area PX. The cover region CL may overlap the domain boundary region CA along the first direction d1. A protruding width of the cover region CL may be smaller than a width of each data line DL. That is, the cover region CL may protrude to a minimum width that can prevent color mixing, thereby preventing a reduction in aperture ratio.

In an exemplary embodiment, the cover region CL, like the data lines DL, may include a refractory metal, such as molybdenum, chrome, tantalum or titanium, or an alloy of these metals. In an exemplary embodiment, the cover region CL may also have a multilayer structure including a refractory metal layer and a conductive layer having low resistivity, for example. In addition, the cover region CL according to the illustrated exemplary embodiment may further include a blocking metal layer BL including chrome oxide. In an exemplary embodiment, the cover region CL and like the data lines DL may be a triple layer having a chrome or molybdenum (alloy) layer, an aluminum (alloy) layer and a chrome oxide layer stacked sequentially or a quadruple layer having a molybdenum (alloy) layer, an aluminum (alloy) layer, a molybdenum (alloy) layer and a chrome oxide layer stacked sequentially, for example. The blocking metal layer BL can easily block light L provided by the backlight assembly (not illustrated) disposed thereunder. The blocking metal layer BL may be disposed on each of the data lines DL. However, the invention is not limited thereto, and the blocking metal layer BL can also be disposed along each of the data lines DL. That is, each of the data lines DL according to the illustrated exemplary embodiment may further include the blocking metal layer BL disposed on or under the data line DL. The blocking metal layer BL provided along each of the data lines DL may negate the need for a block matrix that covers the data lines DL of the LCD 10 according to the illustrated exemplary embodiment. In FIG. 1, the cover region CL is rectangular, for example. However, the shape of the cover region CL is not limited to the rectangular shape, and the cover region CL can have various shapes such as triangular and circular shapes.

As illustrated in FIG. 4, a first cover region CL1 extending from a first data line DL1 toward the first pixel area PX1 can block light emitted from thereunder. Therefore, even when the alignment of liquid crystal molecules located above the first cover region CL1 is unstable, backlight L can be blocked by the first cover region CL1. That is, the leakage of light can be prevented, thereby preventing a reduction in display quality.

The LCD 10 according to the illustrated exemplary embodiment includes the pixel electrodes 150, in which the openings OP is defined therebetween, and each of the openings OP has a double bent portion. This can increase the alignment stability of liquid crystal molecules and prevent the leakage of light caused by the above structure to the cover region CL protruding from each of the data lines DL. Therefore, improved display quality can be provided.

Hereinafter, another exemplary embodiment of the invention will be described.

Figure 5:
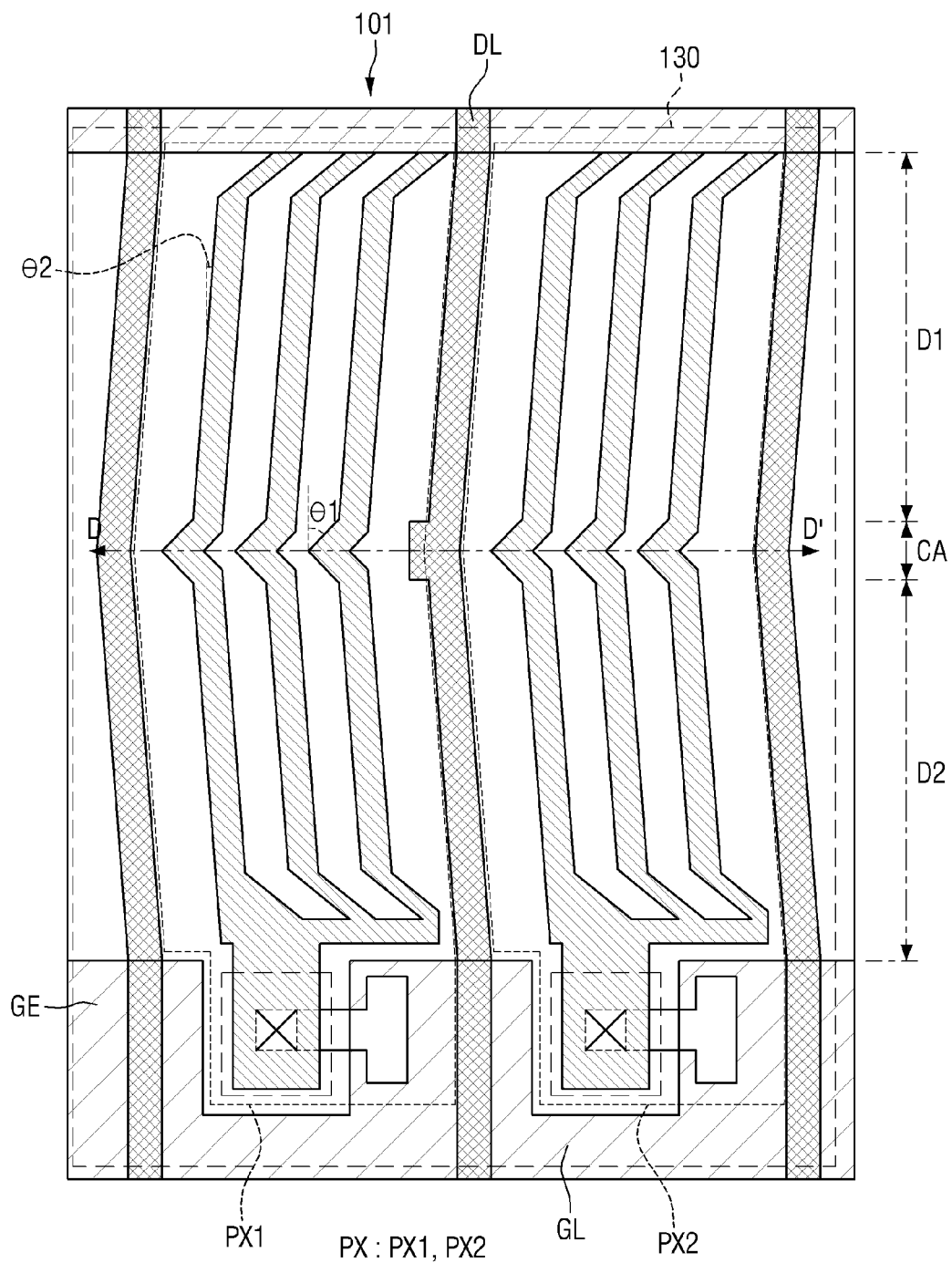
FIG. 5 is a plan view of a first display substrate of an LCD according to another exemplary embodiment of the invention.
Figure 6:
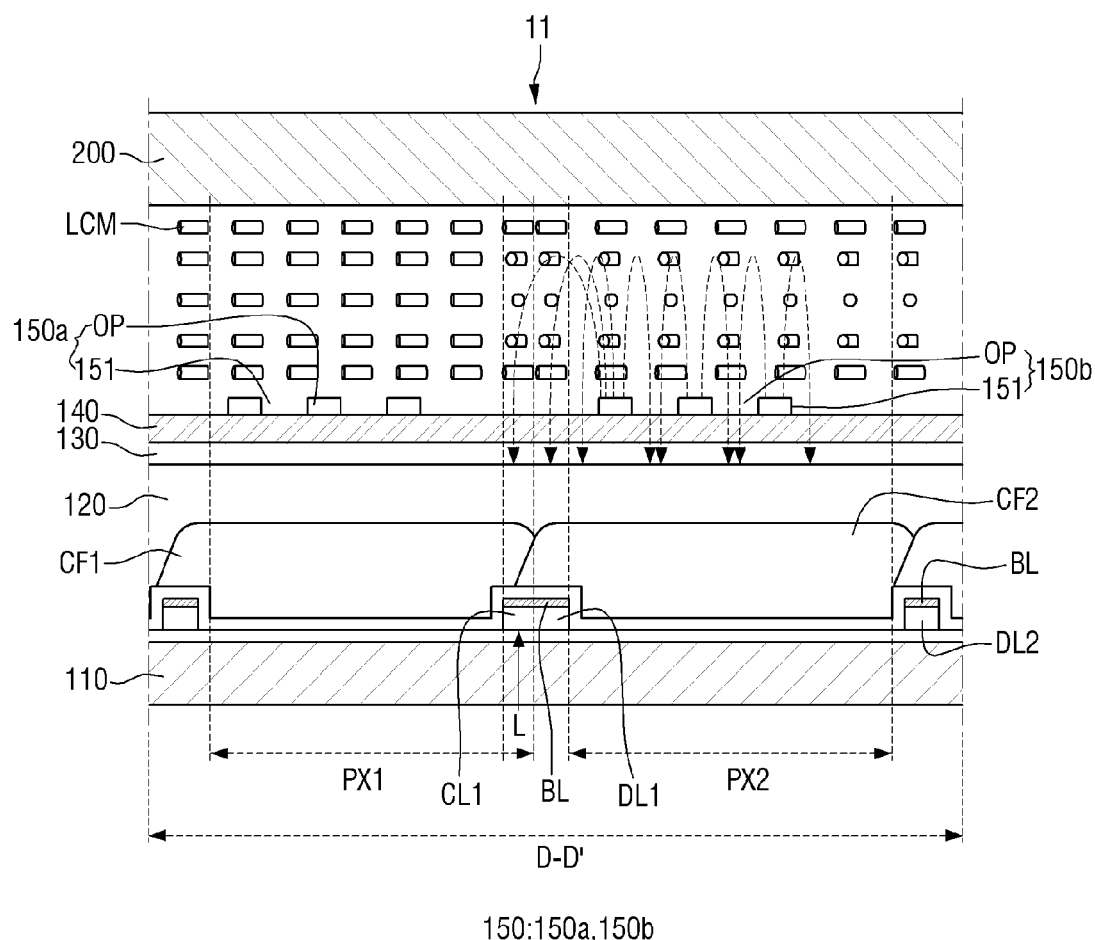
FIG. 6 is a cross-sectional view taken along line D-D' of FIG. 5.

FIG. 5 is a plan view of a first display substrate 101 of an LCD 11 according to another exemplary embodiment of the invention. FIG. 6 is a cross-sectional view taken along line D-D' of FIG. 5. In the illustrated exemplary embodiment, elements substantially identical to those described above are indicated by like reference numerals, and a redundant description thereof will be omitted or given briefly.

Referring to FIGS. 5 and 6, the LCD 11 according to the illustrated exemplary embodiment includes the first display substrate 101, and an array substrate 110 of the first display substrate 101 includes a first pixel area PX1 and a second pixel area PX2. In the illustrated exemplary embodiment, elements substantially identical to those described above are indicated by like reference numerals, and a redundant description thereof will be omitted or given briefly.

The first pixel area PX1 may be an area defined by a first gate line GL1 extending along a first direction D1 and a first data line DL1. The first data line DL1 may intersect the first gate line GL1 with a gate insulating layer 160 interposed therebetween. The second pixel area PX2 may be an area defined by the first gate line GL1 and a second data line DL2. The second data line DL2 may be disposed on the gate insulating layer 160 along the first direction D1 to extend side by side with the first data line DL1 and intersect the first gate line GL1. A first pixel electrode 150a and a second pixel electrode 150b may be located in the first pixel area PX1 and the second pixel area PX2, respectively. Here, the first and second pixel electrodes 150a and 150b are distinguished from each other only for ease of description and may be substantially the same as the pixel electrodes 150 of FIGS. 1 through 4.

Each of the first and second pixel electrodes 150a and 150b may include a plurality of branch electrodes 151 and a plurality of openings OP defined between the branch electrodes 151. Each of the openings OP may include a first bent portion a1 which corresponds to a middle part of a corresponding pixel area and a second bent portion a2 and a third bent portion a3 which are separated from the first bent portion a1 and located symmetrically to each other with respect to the first bent portion a1. The middle part of each of the first and second pixel areas PX1 and PX2 may be defined as a domain boundary region CA, a region located higher than the middle part may be defined as a first domain D1, and a region located lower than the middle part may be defined as a second domain D2. The first bent portion a1 may correspond to the domain boundary region CA, the second bent portion a2 may correspond to the first domain D1, and the third bent portion a3 may correspond to the second domain D2. Each opening OP may have a symmetrical structure with respect to a virtual line that passes through the first bent portion a1 located in the middle part of each pixel area PX and extends parallel to a gate line GL.

Here, a cover region CL which covers at least a region of the first pixel area PX1 may be included only in the first data line DL1. That is, the cover region CL which covers at least a region of the second pixel area PX2 may not be provided in the second data line DL2. The cover region CL of the first data line DL1 may overlap the first bent portion a1 in the first direction D1 and protrude toward the first pixel area PX1. In an exemplary embodiment, a protruding width of the cover region CL may be smaller than a width of a data line DL. That is, the cover region CL may protrude to a minimum width that can prevent color mixing, thereby preventing a reduction in aperture ratio.

In an exemplary embodiment, the cover region CL, like the data lines DL, may include a refractory metal, such as molybdenum, chrome, tantalum or titanium, or an alloy of these metals. The cover region CL may also have a multilayer structure including a refractory metal layer and a conductive layer having low resistivity. In addition, the cover region CL according to the illustrated exemplary embodiment may further include a blocking metal layer BL including chrome oxide. In an exemplary embodiment, the cover region CL and the data lines DL may be a triple layer having a chrome or molybdenum (alloy) layer, an aluminum (alloy) layer and a chrome oxide layer stacked sequentially, or a quadruple layer having a molybdenum (alloy) layer, an aluminum (alloy) layer, a molybdenum (alloy) layer and a chrome oxide layer stacked sequentially, for example. The blocking metal layer BL can easily block light L provided by a backlight assembly (not illustrated) disposed thereunder. The blocking metal layer BL may be disposed on each data line DL. However, the invention is not limited thereto, and the blocking metal layer BL can also be disposed along each data line DL. That is, each data line DL according to the illustrated exemplary embodiment may further include the blocking metal layer BL disposed on or under the data line DL. The blocking metal layer BL provided along each data line DL may negate the need for a block matrix that covers the data lines DL of the LCD 10 according to the illustrated exemplary embodiment. In FIG. 5, the cover region CL is rectangular. However, the shape of the cover region CL is not limited to the rectangular shape, and the cover region CL can have various shapes such as triangular and circular shapes.

Here, the first pixel area PX1 may overlap a first color filter CF1, and the second pixel area PX2 may overlap a second color filter CF2. The second color filter CF2 may be a different color from the first color filter CF1. A color difference between the first color filter CF1 and the second color filter CF2 may cause light emitted from the first pixel area PX1 to have a higher luminance than light emitted from the second pixel area PX2. When some light of the first pixel area PX1 is displayed when it is intended to display light of only the second pixel area PX2, display quality may be reduced significantly due to color mixing. On the contrary, even when some light of the second pixel area PX2 is displayed when it is intended to display light of only the first pixel area PX1, a reduction in display quality due to color mixing may not be significant. In an example, the first pixel area PX1 may overlap a green color filter G, and the second pixel area PX2 may overlap a color filter of a different color from the green color filter G. The second pixel area PX2 may overlap a blue color filter B or a red color filter R. The first color filter CF1 may be the green color filter G, and the second color filter CF2 may be the red color filter R or the blue color filter B. When backlight of the same luminance level is transmitted through the green color filter G, the blue color filter B and the red color filter R, light having a highest luminance level may be green light among blue light, green light, and red light emerging from the blue color filter B, the green color filter G and the red color filter R, respectively. That is, when a pixel area overlapped by the red color filter R, a pixel area overlapped by the green color filter G, and a pixel area overlapped by the blue color filter B provide one unit pixel area, a pixel area that determines a luminance level of the unit pixel area may be the pixel area overlapped by the green color filter G. A reduction in display quality due to color mixing may be great when green is mixed with blue or red.

In another example, when a pixel area overlapped by the red color filter R, a pixel area overlapped by the green color filter G, a pixel area overlapped by the blue color filter B and a pixel area overlapped by a white color filter W provide one unit pixel area, a pixel area having the highest luminance level may be the pixel area overlapped by the white color filter W. Here, the first pixel area PX1 may be overlapped by the white color filter W, and the second pixel area PX2 may be overlapped by the red color filter R, the green color filter G, or the blue color filter B. The first color filter CF1 may be the white color filter W, and the second color filter CF2 may be the green color filter G, the red color filter R or the blue color filter B. Color mixing with white light can increase the overall luminance of light but reduce the color purity of light to be displayed, thereby causing a reduction in display quality.

The first data line DL1 of the first pixel area PX1 that can cause a reduction in display quality due to color mixing may include a cover region CL which covers a region of the first pixel area PX1. In addition, the second data line DL2 of the second pixel area PX2 that causes a small reduction in display quality due to color mixing may not include the cover region CL. That is, the LCD 11 according to the illustrated exemplary embodiment includes the cover region CL only in the first pixel area PX that can reduce display quality. Therefore, it is possible to provide improved display quality while minimizing a reduction in transmittance and aperture ratio caused by the formation of the cover region CL in a display area.

Exemplary embodiments of the invention provide at least one of the following advantages.

It is possible to increase the alignment stability of liquid crystals and reduce the leakage of light in a pixel. That is, improved display quality can be provided.

However, the effects of the invention are not restricted to the one set forth herein. The above and other effects of the invention will become more apparent to one of daily skill in the art to which the invention pertains by referencing the claims.

While the invention has been particularly shown and described with reference to exemplary embodiments thereof, it will be understood by those of ordinary skill in the art that various changes in provide and detail may be made therein without departing from the spirit and scope of the invention as defined by the following claims. The exemplary embodiments should be considered in a descriptive sense only and not for purposes of limitation.

What is claimed is:

1. An array substrate comprising:
    a first gate line which extends along a first direction;
    a gate insulating layer which covers the first gate line;
    a first data line which is located on the gate insulating layer and intersects the first gate line to define a first pixel area;
    a second data line which is located on the gate insulating layer along the first direction to extend side by side with the first data line and intersects the first gate line to define a second pixel area;
    a first pixel electrode which is located in the first pixel area;
    a second pixel electrode which is located in the second pixel area;
    a common electrode which overlaps the first pixel electrode and the second pixel electrode; and
    a first insulating layer which is located between the first and second pixel electrodes and the common electrode,
    wherein
    the first pixel area overlaps a first color filter,
    the second pixel area overlaps a second color filter which has a different color from the first color filter,
    each of the first pixel electrode and the second pixel electrode comprises a plurality of branch electrodes,
    a plurality of openings is defined between the plurality of branch electrodes,
    each of the plurality of openings comprises a first bent portion which corresponds to a middle part of each of the first and second pixel areas and a second bent portion and a third bent portion which are located symmetrically to each other with respect to the first bent portion, and only the first data line comprises a cover region which covers at least part of the first pixel area.

2. The array substrate of claim 1, wherein each of the first pixel area and the second pixel area comprises:
- a first domain which is located higher than the middle part of the first or second pixel area;
- a second domain which is located lower than the middle part of the first or second pixel area; and
- a domain boundary region which corresponds to the middle part of the first or second pixel area,
- wherein the first domain corresponds to the second bent portion, the second domain corresponds to the third bent portion, each opening located in the domain boundary region defines a first angle to a virtual line which extends along a second direction perpendicular to the first direction, each opening located in the first domain and the second domain defines a second angle, which is smaller than the first angle, to the virtual line, and each of the first data line and the second data line comprises a part which extends symmetrically with respect to the middle part of the first or second pixel area while defining the second angle to the virtual line.

3. The array substrate of claim 1, wherein a cover region which covers at least part of the second pixel area is not provided in the second data line.

4. The array substrate of claim 1, wherein the first color filter is a green color filter, and the second color filter is a red color filter or a blue color filter.

5. The array substrate of claim 1, wherein the first color filter is a white color filter, and the second color filter is one of a green color filter, a red color filter, and a blue color filter.

6. The array substrate of claim 1, wherein a protruding width of the cover region is smaller than a width of each of the first data line and the second data line.

7. The array substrate of claim 6, wherein the cover region comprises a blocking metal layer, and each of the first data line and the second data line comprises a blocking metal layer.

8. The array substrate of claim 1, wherein the cover region protrudes toward the middle part of the first pixel area to overlap the first bent portion in the first direction.

* * * * *